United States Patent
Gupta (10) Patent No.: US 12,475,897 B2
(45) Date of Patent: Nov. 18, 2025

(54) SYSTEM AND METHOD FOR AUGMENTED DATA CHANNEL PROCESSING USING ACOUSTIC DEVICES

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 740 days.

(21) Appl. No.: 17/570,824

(22) Filed: Jan. 7, 2022

(65) Prior Publication Data

US 2023/0223029 A1 Jul. 13, 2023

(51) Int. Cl.
| | |
|---|---|
| *G10L 17/06* | (2013.01) |
| *G10L 15/22* | (2006.01) |
| *G10L 17/22* | (2013.01) |
| *H04L 9/40* | (2022.01) |
| *G10L 17/00* | (2013.01) |

(52) U.S. Cl.
CPC .............. *G10L 17/06* (2013.01); *G10L 15/22* (2013.01); *G10L 17/22* (2013.01); *H04L 63/0861* (2013.01); *G10L 2015/223* (2013.01); *G10L 2015/227* (2013.01); *G10L 17/00* (2013.01)

(58) Field of Classification Search
CPC ......... G10L 17/06; G10L 15/22; G10L 17/22; G10L 17/00; G10L 2015/223; G10L 2015/227; H04L 63/0861
USPC ....................................................... 704/246
See application file for complete search history.

(56) References Cited

U.S. PATENT DOCUMENTS

| | | | | |
|---|---|---|---|---|
| 7,451,917 B2 * | 11/2008 | McCall | ..................... | G07F 7/10 235/379 |
| 7,596,269 B2 * | 9/2009 | King | ..................... | G06F 16/332 382/177 |
| 7,606,752 B2 * | 10/2009 | Hazlehurst | ............. | G06Q 30/04 705/40 |
| 8,316,237 B1 * | 11/2012 | Felsher | ................. | H04L 63/061 380/282 |

(Continued)

FOREIGN PATENT DOCUMENTS

| | | | | |
|---|---|---|---|---|
| CA | 3107506 A1 * | 2/2020 | ............. | G06Q 40/02 |
| CN | 104599176 A * | 5/2015 | | |

*Primary Examiner* — Edwin S Leland, III
(74) *Attorney, Agent, or Firm* — Moore & Van Allen PLLC; Nicholas C. Russell (57) ABSTRACT

Systems, methods, and computer program products are provided for augmented data channel processing using acoustic devices. The method includes receiving a request for a user data channel processing action associated with a user. The user data channel processing action is associated with a vendor. The method also includes causing an audible notification to an acoustic device associated with the user. The audible notification is a prompt to authorize the user data channel processing action to be executed. The method further includes receiving a voice command from the acoustic device associated with the user. The voice command is a confirmation of the user data channel processing action. The method still further includes verifying the voice command from the acoustic device associated with the user is from the user. The method also includes causing an execution of the user data channel processing action based upon the verification of the voice command.

17 Claims, 7 Drawing Sheets

(56) References Cited

U.S. PATENT DOCUMENTS

| | | | | |
|---|---|---|---|---|
| 8,625,838 | B2* | 1/2014 | Song | H04L 63/101 |
| | | | | 235/380 |
| 8,660,943 | B1* | 2/2014 | Chirehdast | G06Q 40/03 |
| | | | | 705/38 |
| 9,189,783 | B2* | 11/2015 | Chowdhury | G06Q 20/325 |
| 9,860,709 | B2* | 1/2018 | Addepalli | H04W 72/53 |
| 9,942,681 | B2* | 4/2018 | Dufosse | H04R 1/1083 |
| 10,043,209 | B2* | 8/2018 | Cooke | G06Q 30/0641 |
| 10,614,492 | B2* | 4/2020 | Frazier | G06Q 40/00 |
| 10,887,764 | B1* | 1/2021 | Mokady | H04W 4/14 |
| 10,902,855 | B2* | 1/2021 | Min | G06F 3/167 |
| 11,057,718 | B2* | 7/2021 | King | H04R 25/305 |
| 11,461,751 | B2* | 10/2022 | Cassel | G06Q 40/03 |
| 11,880,814 | B2* | 1/2024 | Ratnakaram | G06Q 20/102 |
| 2014/0081853 | A1* | 3/2014 | Sanchez | G06Q 30/0233 |
| | | | | 705/40 |
| 2014/0172430 | A1* | 6/2014 | Rutherford | G06F 3/167 |
| | | | | 704/273 |
| 2016/0012465 | A1* | 1/2016 | Sharp | G06Q 20/321 |
| | | | | 705/14.17 |
| 2017/0011406 | A1* | 1/2017 | Tunnell | G06Q 20/308 |
| 2018/0068299 | A1* | 3/2018 | Cooke | H04M 15/68 |
| 2018/0096334 | A1* | 4/2018 | Studnicka | G10L 15/22 |
| 2018/0101901 | A1* | 4/2018 | Jones-McFadden | G06Q 40/02 |
| 2019/0012444 | A1* | 1/2019 | Lesso | H04R 1/1041 |
| 2020/0005295 | A1* | 1/2020 | Murphy | G06Q 20/405 |
| 2020/0104095 | A1* | 4/2020 | Sarir | G08B 5/38 |
| 2020/0104326 | A1* | 4/2020 | Ricci | G06Q 30/012 |
| 2020/0105254 | A1* | 4/2020 | Sarir | G06F 3/167 |
| 2020/0177377 | A1* | 6/2020 | Smith | G06Q 20/3674 |
| 2020/0202317 | A1* | 6/2020 | Cassel | G06Q 30/00 |
| 2020/0342459 | A1* | 10/2020 | Boyle | H04L 63/0876 |
| 2020/0380482 | A1* | 12/2020 | Hoffman | G06Q 20/02 |
| 2021/0034157 | A1* | 2/2021 | Lee | G06F 3/043 |
| 2021/0110471 | A1* | 4/2021 | Shah | G06Q 40/03 |
| 2022/0043847 | A1* | 2/2022 | Kuniyoshi | G06V 30/1983 |
| 2023/0067616 | A1* | 3/2023 | Chan | G06Q 10/109 |
| 2023/0223029 | A1* | 7/2023 | Gupta | H04L 63/0861 |

* cited by examiner

SYSTEM AND METHOD FOR AUGMENTED DATA CHANNEL PROCESSING USING ACOUSTIC DEVICES

TECHNOLOGICAL FIELD

An example embodiment relates generally to data processing using acoustic devices, and more particularly, to providing augmented data channel processing using acoustic devices.

BACKGROUND

Acoustic devices are becoming more widely used as voice command technology has improved. However, notifying users of potential necessary commands using acoustic devices is difficult and inefficient as there lacks uniform data channel processing using acoustic devices. As such, there exists a need for a system that allows for improved acoustic device integration.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for augmented data channel processing using acoustic devices is provided. The system includes at least one non-transitory storage device and at least one processing device coupled to the at least one non-transitory storage device. The at least one processing device is configured to receive a request for a user data channel processing action associated with a user. The user data channel processing action is associated with a vendor. The at least one processing device is also configured to cause an audible notification to an acoustic device associated with the user. The audible notification is a prompt to authorize the user data channel processing action to be executed. The at least one processing device is further configured to receive a voice command from the acoustic device associated with the user. The voice command is a confirmation of the user data channel processing action. The at least one processing device is still further configured to verify the voice command from the acoustic device associated with the user is from the user. The at least one processing device is also configured to cause an execution of the user data channel processing action based upon the verification of the voice command.

In some embodiments, the at least one processing device is further configured to receive user account information and cause a transmission of a request for a user data channel processing action information for a user based on the user account information received. In such an embodiment, the user account information includes at least one of a name of the user, a phone number of the user, or an address of the user.

In some embodiment, the at least one processing device is further configured to receive one or more additional requests for a user data channel processing action associated with the user. Each of the one or more additional requests for a user data channel processing action is associated with a different vendor. In some embodiments, the audible notification includes at least one of a user data channel processing action amount or a user data channel processing action due date.

In some embodiments, the audible notification includes one or more potential responses to the user data channel processing action. In some embodiments, in an instance in which the voice command from the acoustic device associated with the user is one of the potential responses provided in the audible notification, the at least one processing device is further configured to automatically cause execution of the potential response included in the voice command.

In some embodiments, verifying the voice command from the acoustic device associated with the user is from the user includes at least one of comparing the voice command from the acoustic device associated with the user with a voice sample of the user using voice recognition technology or comparing an identification number received from the acoustic device associated with the user with an identification number associated with the user.

In another example embodiment, a computer program product for augmented data channel processing using acoustic devices is provided. The computer program product includes at least one non-transitory computer-readable medium having computer-readable program code portions embodied therein. The computer-readable program code portions include an executable portion configured to receive a request for a user data channel processing action associated with a user. The user data channel processing action is associated with a vendor. The computer-readable program code portions also include an executable portion configured to cause an audible notification to an acoustic device associated with the user. The audible notification is a prompt to authorize the user data channel processing action to be executed. The computer-readable program code portions further include an executable portion configured to receive a voice command from the acoustic device associated with the user. The voice command is a confirmation of the user data channel processing action. The computer-readable program code portions still further include an executable portion configured to verify the voice command from the acoustic device associated with the user is from the user. The computer-readable program code portions also include an executable portion configured to cause an execution of the user data channel processing action based upon the verification of the voice command.

In some embodiments, the computer-readable program code portions further include an executable portion configured to receive user account information and cause a transmission of a request for a user data channel processing action information for a user based on the user account information received. In such an embodiment, the user account information includes at least one of a name of the user, a phone number of the user, or an address of the user.

In some embodiments, the computer-readable program code portions further include an executable portion configured to receive one or more additional requests for a user data channel processing action associated with the user. Each of the one or more additional requests for a user data channel processing action is associated with a different vendor. In some embodiments, the audible notification includes at least one of a user data channel processing action amount or a user data channel processing action due date.

In some embodiments, the audible notification includes one or more potential responses to the user data channel processing action. In some embodiments, in an instance in which the voice command from the acoustic device associated with the user is one of the potential responses provided in the audible notification, the computer-readable program code portions further include an executable portion configured to automatically cause execution of the potential response included in the voice command.

In some embodiments, verifying the voice command from the acoustic device associated with the user is from the user includes at least one of comparing the voice command from the acoustic device associated with the user with a voice sample of the user using voice recognition technology or comparing an identification number received from the acoustic device associated with the user with an identification number associated with the user.

In still another example embodiment, a computer-implemented method for augmented data channel processing using acoustic devices is provided. The method includes receiving a request for a user data channel processing action associated with a user. The user data channel processing action is associated with a vendor. The method also includes causing an audible notification to an acoustic device associated with the user. The audible notification is a prompt to authorize the user data channel processing action to be executed. The method further includes receiving a voice command from the acoustic device associated with the user. The voice command is a confirmation of the user data channel processing action. The method still further includes verifying the voice command from the acoustic device associated with the user is from the user. The method also includes causing an execution of the user data channel processing action based upon the verification of the voice command.

In some embodiments, the method also includes receiving user account information and causing a transmission of a request for a user data channel processing action information for a user based on the user account information received. In such an embodiment, the user account information includes at least one of a name of the user, a phone number of the user, or an address of the user.

In some embodiments, the method also includes receiving one or more additional requests for a user data channel processing action associated with the user. Each of the one or more additional requests for a user data channel processing action is associated with a different vendor. In some embodiments, the audible notification includes at least one of a user data channel processing action amount or a user data channel processing action due date.

In some embodiments, the audible notification includes one or more potential responses to the user data channel processing action. In an instance in which the voice command from the acoustic device associated with the user is one of the potential responses provided in the audible notification, the method also includes automatically causing execution of the potential response included in the voice command.

In some embodiments, verifying the voice command from the acoustic device associated with the user is from the user includes at least one of comparing the voice command from the acoustic device associated with the user with a voice sample of the user using voice recognition technology or comparing an identification number received from the acoustic device associated with the user with an identification number associated with the user.

Embodiments of the present disclosure address the above needs and/or achieve other advantages by providing apparatuses (e.g., a system, computer program product and/or other devices) and methods for augmented data channel processing using acoustic devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Acoustic devices, such as wearable acoustic devices, are not currently leveraged properly for digital transactions and transfers. The lack of acoustic device integration in bill payment and processing can make such operations difficult for visually impaired persons or people who prefer to use acoustic devices. Various embodiments of the present disclosure allow for acoustic devices (e.g., wearable acoustic devices) to be integrated with various third party vendors in the user's region, resulting in command recommendation and reminders based on communications with the vendors.

The vendors (e.g., electric company, water company, credit card company, loan provider, etc.) can provide bill information to an entity, such as a financial institution, based on information provided by the user, such as phone number or other identifiers. The information received from the vendor can be saved to either the entity system or the acoustic device, such that the user can be alerted of due dates or information that may need authorization by a user. The user can, in response to the alert, provide a command via the acoustic device to carry out any necessary operations (e.g., pay bill from said vendor). The device can communicate with multiple different entity systems (e.g., different banks) and select an account to pay said bill.

Figure 1:
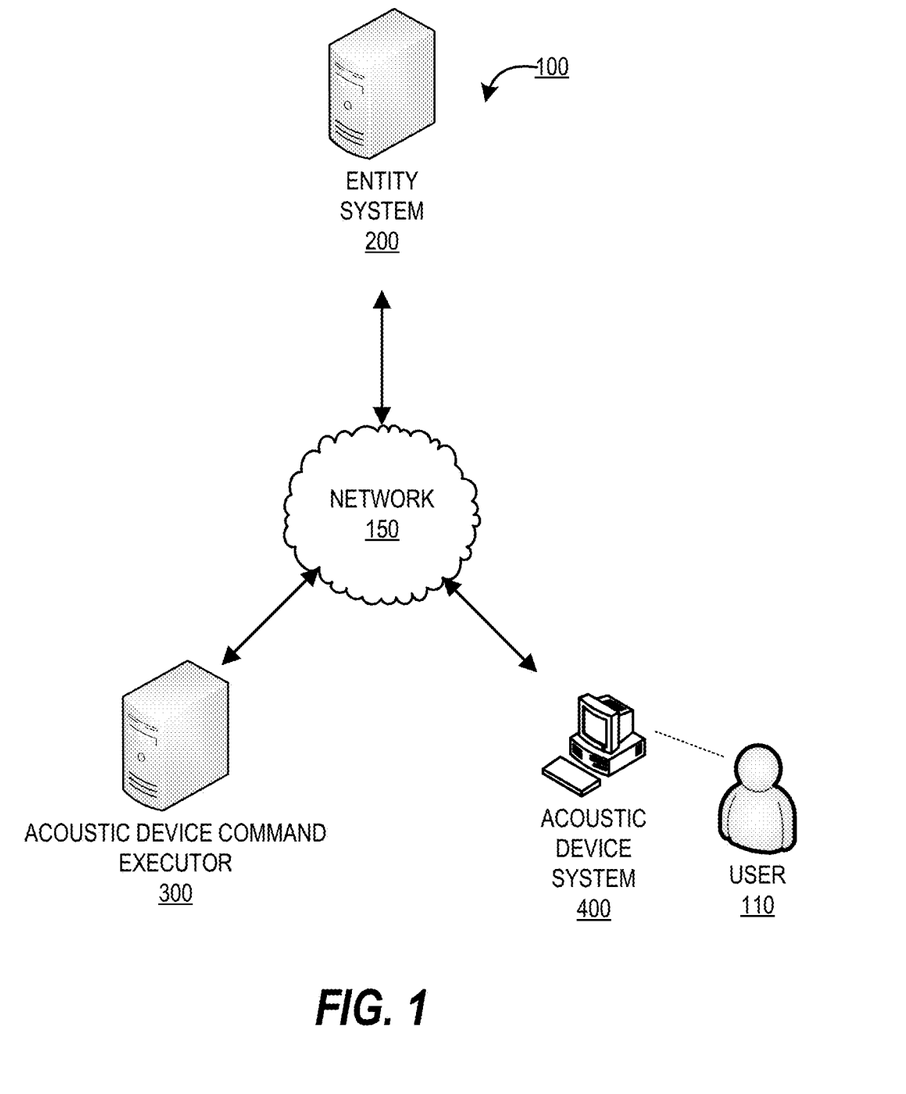
FIG. 1 provides a block diagram illustrating a system environment for augmented data channel processing using acoustic devices, in accordance with an embodiment of the present disclosure.

FIG. 1 provides a block diagram illustrating a system environment 100 for augmented data channel processing using acoustic devices, in accordance with an embodiment of the invention. As illustrated in FIG. 1, the environment 100 includes an acoustic device command executor 300, an entity system 200, and an acoustic device system 400. One or more users 110 may be included in the system environment 100, where the users 110 interact with the other entities of the system environment 100 via a user interface of the acoustic device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The acoustic device command executor 300 is a system of the present invention for performing one or more process steps described herein. In some embodiments, the acoustic device command executor 300 may be an independent system. In some embodiments, the acoustic device command executor 300 may be a part of the entity system 200.

The acoustic device command executor 300, the entity system 200, and the acoustic device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the acoustic device command executor 300 is configured to communicate information or instructions with the entity system 200, and/or the acoustic device system 400 across the network 150.

The acoustic device system 400 may be a system owned or controlled by the entity of the entity system 200 and/or the user 110. As such, the acoustic device system 400 may be a computing device of the user 110. In general, the acoustic device system 400 communicates with the user 110 via an acoustic speaker of the acoustic device system 400, and in turn is configured to communicate information or instructions with the acoustic device command executor 300, and/or entity system 200 across the network 150.

Figure 2:
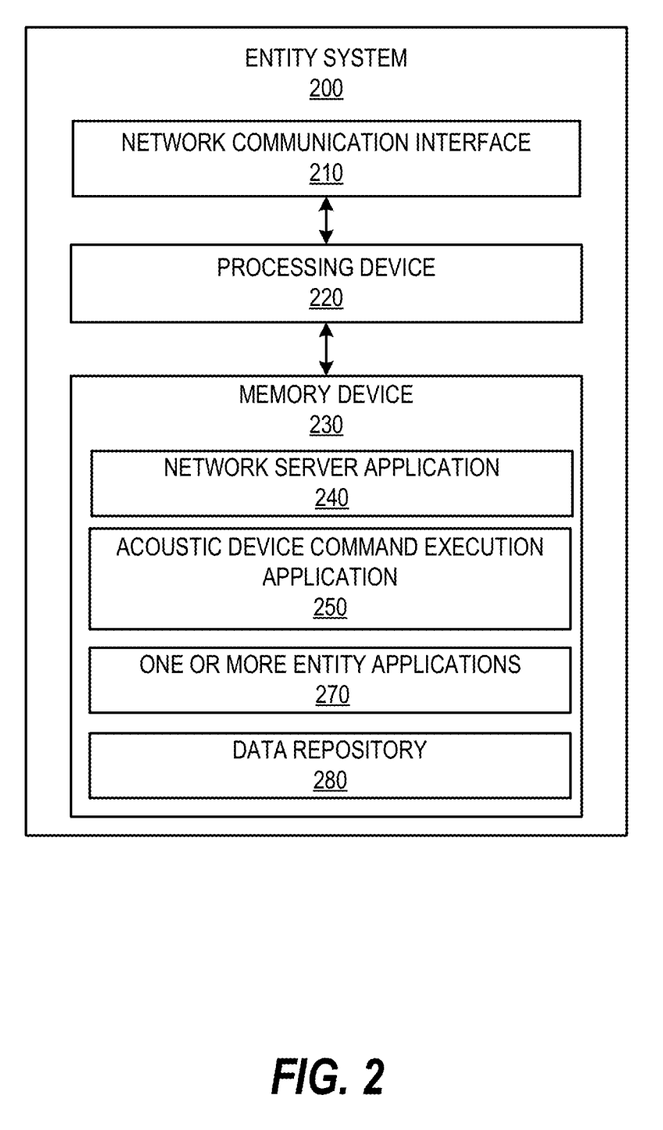
FIG. 2 provides a block diagram illustrating the entity system 200 of FIG. 1, in accordance with an embodiment of the present disclosure.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an acoustic device command execution application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the acoustic device command execution application 250, the one or more entity application 270 to perform certain logic, data-extraction, and data-storing functions of the entity system 200 described herein, as well as communication functions of the entity system 200.

The network server application 240, the acoustic device command execution application 250, and the one or more entity applications 270 are configured to store data in the data repository 280 or to use the data stored in the data repository 280 when communicating through the network communication interface 210 with the acoustic device command executor 300, and/or the acoustic device system 400 to perform one or more process steps described herein. In some embodiments, the entity system 200 may receive instructions from the acoustic device command executor 300 via the acoustic device command execution application 250 to perform certain operations. The acoustic device command execution application 250 may be provided by the acoustic device command executor 300. The one or more entity applications 270 may be any of the applications used, created, modified, facilitated, and/or managed by the entity system 200.

Figure 3:
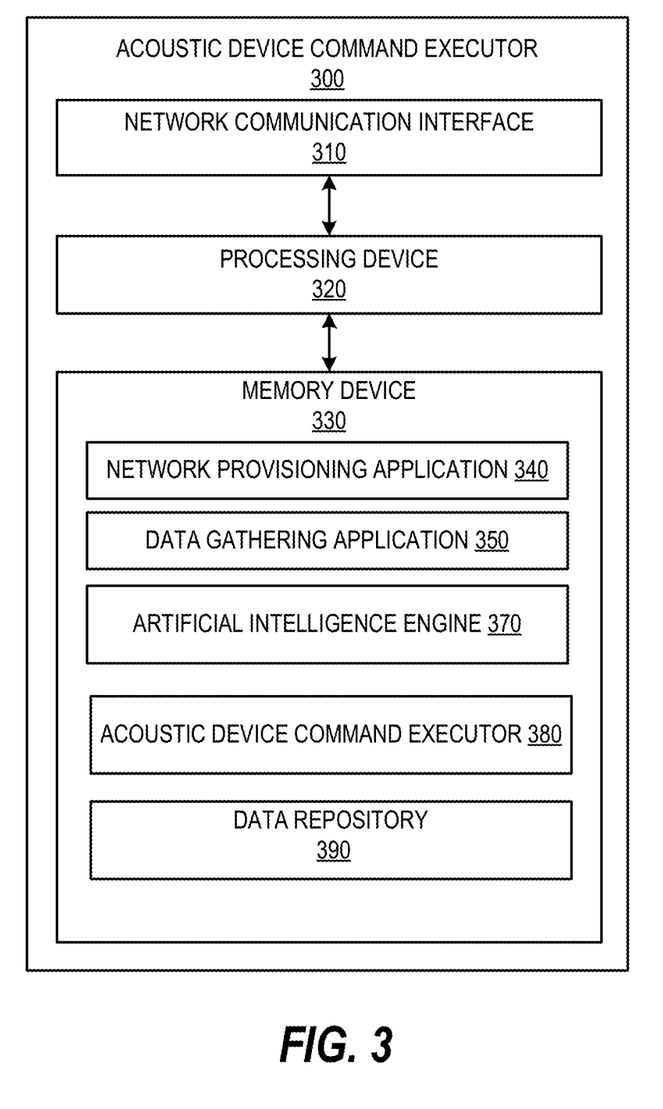
FIG. 3 provides a block diagram illustrating an acoustic device command executor 300 of FIG. 1, in accordance with an embodiment of the present disclosure.

FIG. 3 provides a block diagram illustrating the acoustic device command executor 300 in greater detail, in accordance with embodiments of the invention. As illustrated in FIG. 3, in one embodiment of the invention, the acoustic device command executor 300 includes one or more processing devices 320 operatively coupled to a network communication interface 310 and a memory device 330. In certain embodiments, the acoustic device command executor 300 is operated by an entity, such as a financial institution. In some embodiments, the acoustic device command executor 300 is owned or operated by the entity of the entity system 200. In some embodiments, the acoustic device command executor 300 may be an independent system. In alternate embodiments, the acoustic device command executor 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the acoustic device command executor 300 described herein. For example, in one embodiment of the acoustic device command executor 300, the memory device 330 includes, but is not limited to, a network provisioning application 340, a data gathering application 350, an artificial intelligence engine 370, an acoustic device command executor 380, and a data repository 390 comprising any data processed or accessed by one or more applications in the memory device 330. The computer-executable program code of the network provisioning application 340, the data gathering application 350, the artificial intelligence engine 370, and the acoustic device command executor 380 may instruct the processing device 320 to perform certain logic, data-processing, and data-storing functions of the acoustic device command executor 300 described herein, as well as communication functions of the acoustic device command executor 300.

The network provisioning application 340, the data gathering application 350, the artificial intelligence engine 370, and the acoustic device command executor 380 are configured to invoke or use the data in the data repository 390 when communicating through the network communication interface 310 with the entity system 200, and/or the acoustic device system 400. In some embodiments, the network provisioning application 340, the data gathering application 350, the artificial intelligence engine 370, and the acoustic device command executor 380 may store the data extracted or received from the entity system 200, and the acoustic device system 400 in the data repository 390. In some embodiments, the network provisioning application 340, the data gathering application 350, the artificial intelligence engine 370, and the acoustic device command executor 380 may be a part of a single application.

Figure 4:
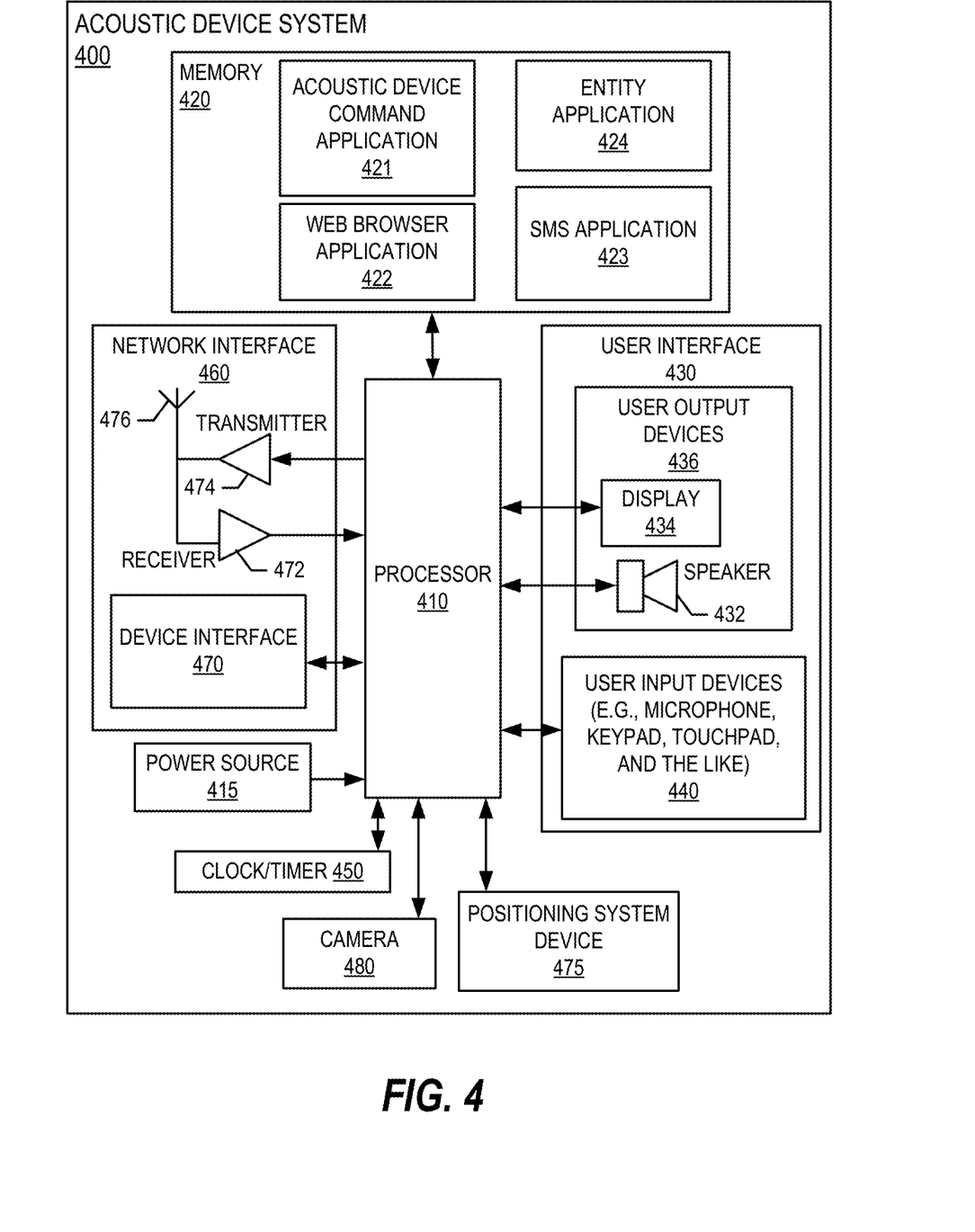
FIG. 4 provides a block diagram illustrating the acoustic device system 400 of FIG. 1, in accordance with an embodiment of the present disclosure.

FIG. 4 provides a block diagram illustrating an acoustic device system 400 of FIG. 1 in more detail, in accordance with embodiments of the invention. However, it should be understood that a mobile telephone is merely illustrative of one type of acoustic device system 400 that may benefit from, employ, or otherwise be involved with embodiments of the present invention and, therefore, should not be taken to limit the scope of embodiments of the present invention. Other types of computing devices may include wearable devices, portable digital assistants (PDAs), pagers, audio/video player, Internet-of-things devices, augmented reality devices, virtual reality devices, automated teller machine devices, electronic kiosk devices, or any combination of the aforementioned.

In an example embodiment, an acoustic wearable device may be paired to a mobile phone that includes the features shown in FIG. 4. Additionally or alternatively, the acoustic wearable device may include at least some of the components shown in FIG. 4 (e.g., a processor 410 and user input device 440) and communicate with the entity system device 200 directly (e.g., without having to be connected to a mobile device or otherwise).

Some embodiments of the acoustic device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the acoustic device system 400. For example, the processor 410 may include a digital signal processor device, a microprocessor device, and various analog to digital converters, digital to analog converters, and/or other support circuits. Control and signal processing functions of the acoustic device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the acoustic device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the acoustic device system 400 may be configured to operate with one or more air interface standards, communication protocols, modulation types, and access types. By way of illustration, the acoustic device system 400 may be configured to operate in accordance with any of a number of first, second, third, and/or fourth-generation communication protocols and/or the like.

As described above, the acoustic device system 400 may have a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The acoustic device system 400 may not, in some instances, have a user interface 430 and instead rely solely on acoustic communication (e.g., the user input device may be a microphone 440).

The user input devices 440, which allow the acoustic device system 400 to receive data from a user such as the user 110, may include any of a number of devices allowing the acoustic device system 400 to receive data from the user 110, such as a microphone and/or other acoustic input device(s). The user interface may also include a camera 480, such as a digital camera.

The acoustic device system 400 may also include a positioning system device 475 that is configured to be used by a positioning system to determine a location of the acoustic device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the acoustic device system 400. In other embodiments, the positioning system device 475 includes a proximity sensor or transmitter, such as an RFID tag, that can sense or be sensed by devices known to be located proximate a merchant or other location to determine that the acoustic device system 400 is located proximate these known devices.

The acoustic device system 400 further includes a power source 415, such as a battery, for powering various circuits and other devices that are used to operate the acoustic device system 400. Embodiments of the acoustic device system 400 may also include a clock or other timer 450 configured to determine and, in some cases, communicate actual or relative time to the processor 410 or one or more other devices.

The acoustic device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the acoustic device system 400 and/or one or more of the process/method steps described herein. For example, the memory 420 may include such applications as a conventional web browser application 422, an acoustic device command application 421, entity application 424. These applications also typically instructions to a graphical user interface (GUI) on the display 430 that allows the user 110 to interact with the entity system 200, the acoustic device command executor 300, and/or other devices or systems. The memory 420 of the acoustic device system 400 may comprise a Short Message Service (SMS) application 423 configured to send, receive, and store data, information, communications, alerts, and the like via the wireless telephone network 152. In some embodiments, the acoustic device command application 421 provided by the acoustic device command executor 300 allows the user 110 to access the acoustic device command executor 300. In some embodiments, the entity application 424 provided by the entity system 200 and the acoustic device command application 421 allow the user 110 to access the functionalities provided by the acoustic device command executor 300 and the entity system 200.

The memory 420 can also store any of a number of pieces of information, and data, used by the acoustic device system 400 and the applications and devices that make up the acoustic device system 400 or are in communication with the acoustic device system 400 to implement the functions of the acoustic device system 400 and/or the other systems described herein.

Figure 5:
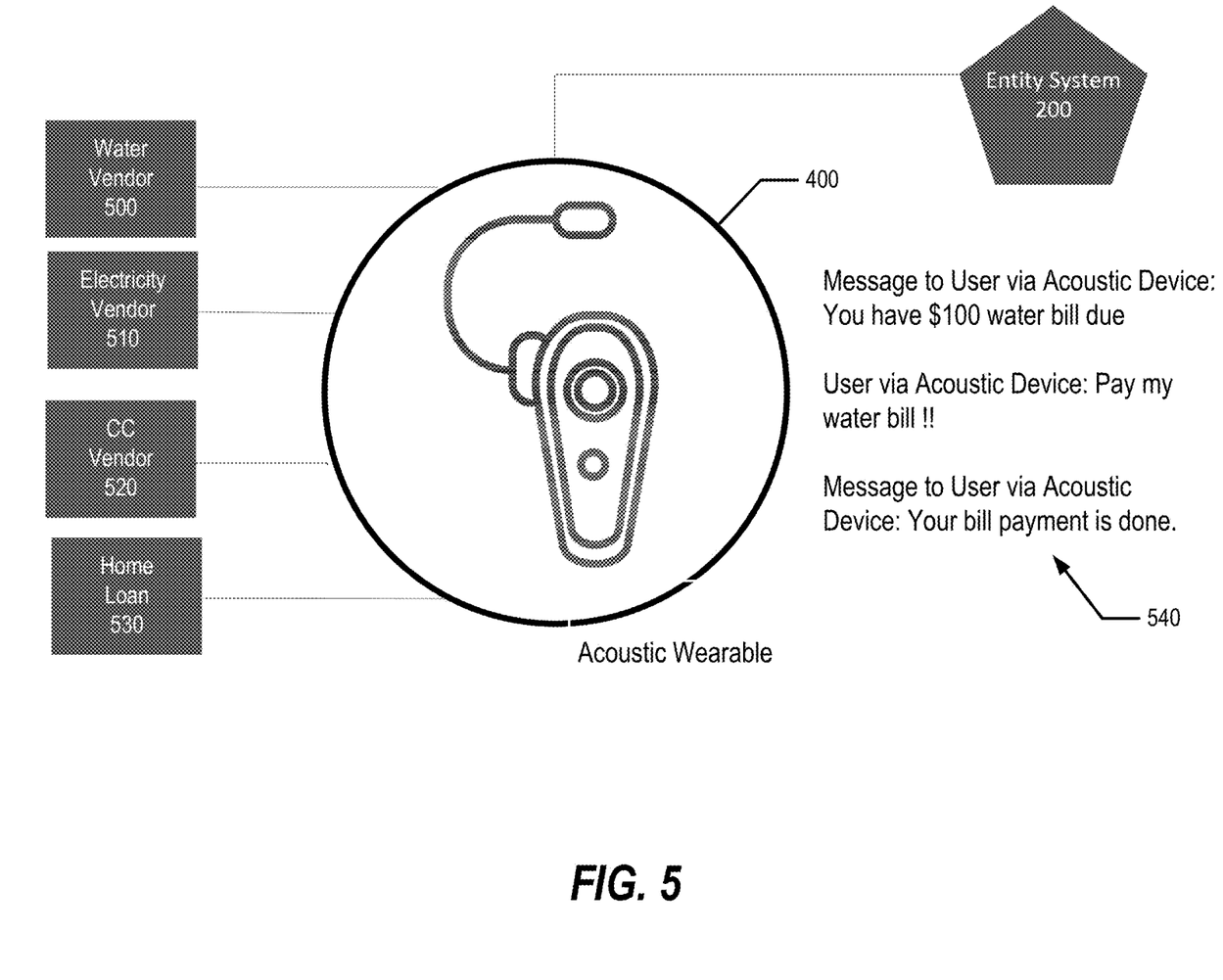
FIG. 5 provides a diagram illustrating the interactions between an acoustic device 400 and the entity system 200 in accordance with an embodiment of the present disclosure.

FIG. 5 illustrates the operations of using a registered acoustic device for communication between a user and an entity, as detailed in FIG. 7 below. While operations are discussed in reference to a single entity system associated with a single entity (e.g., a single financial institution), an acoustic device may be associated with accounts at multiple entities (e.g., different banks), such that the acoustic device 400 may ask the user for the user account to user for a given payment. An acoustic device 400 (e.g., a wearable device) may be associated with a given user or user account. As such, multiple vendors may also be associated with a given user. For example, a user may have accounts with a water vendor 500, an electricity vendor 510, a credit card vendor 520, a home loan vendor 530, and/or other various vendors in which a user may have an account.

The user may connect a given vendor account with the entity system (e.g., connect the given vendor to a bank account of the entity). Additionally or alternatively, the entity system 200 may be in communication with one or more vendors, such that the entity system 200 may retrieve account information about the user based on user information (e.g., name, phone number, address, identification number, etc.). For example, a user may provide a phone number to the entity system 200 and the entity system 200 may communicate with a vendor to associate any accounts with the same phone number with the user. The entity system 200 may communicate with one or more vendors in the area that a user lives or resides. For example, the entity system 200 may communicate with the water company that services the address of the user.

Based on the communication between the vendors and the entity system 200, the entity system 200 can predict user data channel processing actions necessary for a user to complete. For example, a vendor may provide a bill statement to the entity system 200 and the entity system 200 predicts the user data channel processing action of paying the bill based on the due date on the bill. As such, the entity system 200 may be configured to recommend a command based on the information received from the vendor. For example, as shown in the example conversation 540, the user is told that a $100 water bill is due via the acoustic device 400. In response, the user replies to pay the water bill via the acoustic device. The entity system 200 is configured to process said command and provides a message confirming the bill has been paid. The entity system 200 may process the voice command (e.g., pay the water bill) without any additional necessary interaction from the user (e.g., the entity system 200 may process the transaction with the given vendor). The user may also be provided options for responding, such as payment method, time of payment, and/or other options relating to the command. The communication may be prompted solely by the entity system 200.

In response to a voice command from the user, the entity system 200 may request additional verification information before processing the command. For example, the user may be required to provide a pin number or other identifier before the payment is processed. Speech verification may also be used for verification of the voice command inputted into the acoustic device. The operations of the system are discussed in more detail below in reference to FIG. 7.

Figure 6:
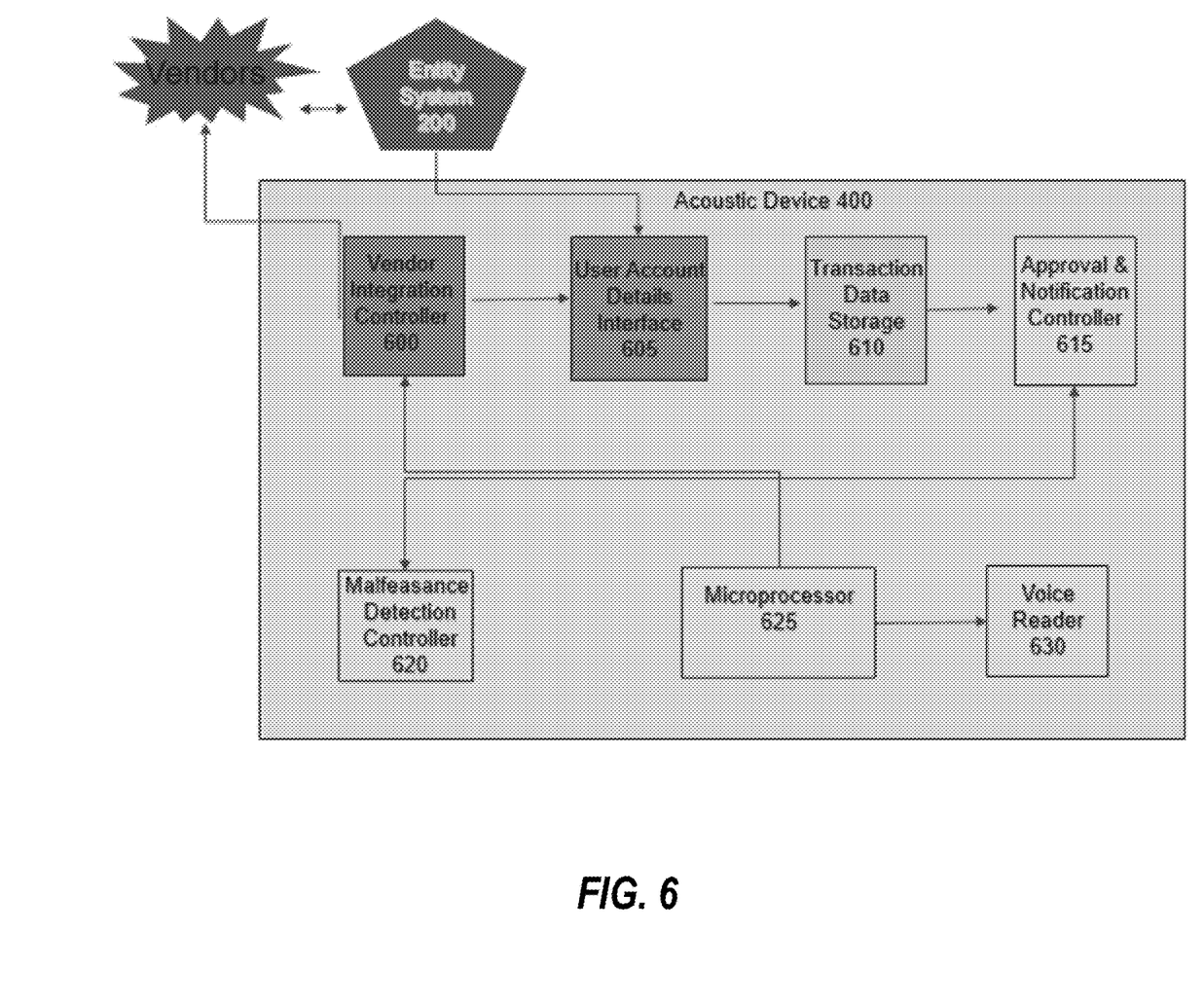
FIG. 6 provides an additional block diagram illustrating an acoustic device system 400 in accordance with an embodiment of the present disclosure.

FIG. 6 illustrates an example architecture of an acoustic device used in various embodiments. As such, the acoustic device 400 may include a vendor integration controller 600, a user account details interface 605, a transaction data storage 610, an approval and notification controller 615, a malfeasance detection controller 620, a microprocessor 625, and/or a voice reader 630. The components may be individual (e.g., individual controllers) or combined (e.g., one or more controllers that in combination perform the operations discussed). The components may each correspond to one or more components shown in FIG. 4 (e.g., the transaction data storage 610 may correspond to the memory 420 shown in FIG. 4). The acoustic device 400 may be connected to a network (e.g., network 150 shown in FIG. 1). The acoustic device 400 may be in communication with the entity system 200 via the network 150 or via other means of communication. Additionally, the acoustic device 400 and/or the entity system 200 may be in communication with one or more vendors, as discussed in reference to FIG. 5 above. The vendors may provide requests for actions by the user (e.g., such as a bill statement). In response to the request for actions, the entity system 200 may initiate an audible communication with the acoustic device associated with the user to notify the user of the potential action (e.g., providing a notification of a pending bill being due). In response, the user may command the entity system to proceed with processing the action (e.g., paying the bill). As such, the acoustic device 400 may communicate with the entity system 200 allowing the operations discussed herein.

Figure 7:
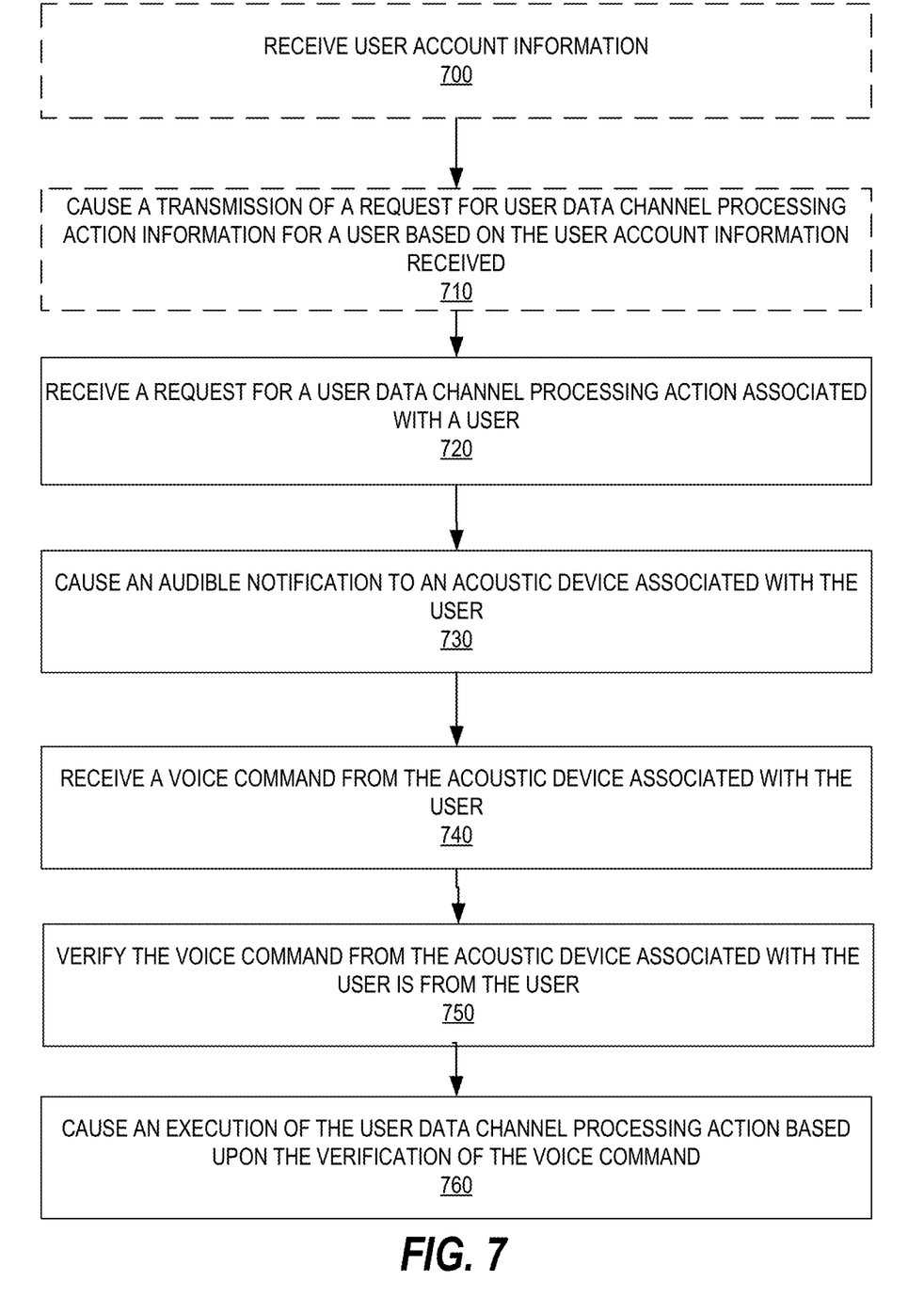
FIG. 7 provides a flowchart illustrating a method of augmented data channel processing using acoustic devices in accordance with embodiments of the present disclosure.

Referring now to FIG. 7, a method is provided for augmented data channel processing using acoustic devices. The method may be carried out by a system discussed herein (e.g., the entity system 200, the acoustic device command executor 300, and/or the acoustic device system 400). An example system may include at least one non-transitory storage device and at least one processing device coupled to the at least one non-transitory storage device. In such an embodiment, the at least one processing device is configured to carry out the method discussed herein.

Referring now to optional Block 700 of FIG. 7, the method may include receiving user account information. The user account information may include information about the user that can be used to identify the user. For example, the user account information may include a name of the user, a phone number of the user, an address of the user, and/or the like. The user account information may be an identifier unique to a given user. The user account information may include identifiers that a user may use with different vendors (e.g., a phone number for the user).

The user account information may be obtained during a registration process. The registration process may be completed using an acoustic device associated with the user. Additionally or alternatively, the registration process may be independent of the acoustic device associated with the user (e.g., when a user opens an account with the entity associated with the entity system 200). For example, the registration process may be completed on a mobile device or the like, or through another type of registration.

In some instances, the user account information may be stored by the entity associated with the entity system 200. The entity system 200 may maintain one or more databases with user account information for users. For example, in an instance the entity associated with the entity system 200 is a financial institution, the financial institution may store user account information for each customer. The account information, as discussed below in reference to Block 710, may be used by a vendor in communication with the system to locate a user account or bill associated with the user.

Referring now to optional Block 710 of FIG. 7, the method may include causing a transmission of a request for user data channel processing action information for a user based on the user account information received. The user data channel processing action information includes information relating to the user data channel processing action, such that the system can determine the user data channel processing action that needs to be executed. For example, the user data channel processing action information may be a billing statement from which the system can determine the user data channel processing action amount (e.g., bill amount) and the due date.

The entity system 200 is configured to communicate with one or more vendors. The entity system 200 may communicate with one or more vendors in which the user may have an account. For example, the entity system 200 may communicate with vendors in an area in which the given area is located. Example vendors may include water companies, electric companies, mortgage companies, credit card companies, and/or any other vendors that a user may have a user data channel processing action (e.g., a bill).

The method may include the system contacting one or more vendors and providing user account information to allow the vendor to locate an account or bill associated with the user. For example, the system may contact a vendor with the name and/or phone number of the user, which allows the vendor to retrieve a bill associated with the user. The communication between the system and the vendors may be independent of the user (e.g., the system may automatically retrieve bills associated with the user for one or more vendors).

The user may also register one or more vendors (or accounts with vendors) with the system. For example, the user may log into a vendor account on a mobile device and the system can then communicate with the vendor based on said login. The system may also retrieve billing statements from a user device (e.g., a billing statement may be emailed to a user and the system may have a permission from the user to access the email).

Referring now to Block 720 of FIG. 7, the method may include receiving a request for a user data channel processing action associated with a user. The request for a user data channel processing action associated with the user is a request from a related vendor to perform a user data channel processing action. The request for a user data channel processing action may be explicit (e.g., the vendor may request a certain amount of money to cover a bill). Additionally or alternatively, the request for a user data channel processing action may be implicitly (e.g., the system, based on the user data channel processing action information, is configured to determine the appropriate user data channel processing action).

The user data channel processing action is associated with a vendor. The user data channel processing action may be a payment to the vendor for a bill due for an account associated with the user. The system may have a receive the request for a user data channel processing action associated with a user directly from a vendor (e.g., the system may communicate with the vendor relating to the user, such as discussed above in reference to Block 710, and the vendor may send a bill or related request for payment to the system).

The system may be configured to determine information relating to the user data channel processing action based on the request. For example, the system may retrieve a user data channel processing action amount and/or due date from a PDF of a user bill. Alternatively, the request for a user data channel processing action associated with a user may include the specific user data channel processing action amount and/or due date (e.g., the vendor may return a prompt from the system with the balance due for the user account).

The system may be in communication with multiple vendors, such that the system is configured to receive multiple requests for a user data channel processing action associated with the same user. For example, the system may receive requests for a user data channel processing action from different vendors (e.g., a user may have bills from the water company, the electric company, and a credit card company). The system is capable of communicating with multiple vendors allowing the system to facilitate the payment of bills without unnecessary user interactions.

Referring now to Block 730 of FIG. 7, the method may include causing an audible notification to an acoustic device associated with the user. The system may cause a transmission to the acoustic device 400 associated with the user. The acoustic device 400 may in response to the transmission from the system generate the audible notification to the user via the acoustic device speaker. The audible notification includes a prompt to authorize the user data channel processing action to be executed. The audible notification may be any information or request for information relating to a user data channel processing action. The audible notification may be a prompt to confirm payment of a bill (e.g., the acoustic device may provide the following audible notification to the user: "Would you like to pay the water bill for December?"). The audible notification may include information relating to the user data channel processing action, such as user data channel processing action amount, the vendor related to the user data channel processing action, the user data channel processing action due date, and/or the like.

The audible notification may also include one or more potential responses to the user data channel processing action. The audible notification may provide example voice commands that a user can reply with that would generate a certain action by the system. For example, the audible notification may include an instruction for the user to say "pay water bill" in response to an audible notification relating to a water bill. The audible notification may include multiple options from which the user can select. The audible notification may also include additional information that may assist a user in authorizing the execution of the user data channel processing action. For example, the audible notification may indicate a primary user bank account or credit card to use to pay a given bill (e.g., "Would you like to pay the water bill with the credit card ending in 1234?").

Referring now to Block 740 of FIG. 7, the method may include receiving a voice command from the acoustic device associated with the user. The voice command can be a confirmation of the user data channel processing action (e.g., the user may respond in the affirmative to pay a bill).

The voice command may include a request for additional information relating to the user data channel processing action. For example, the voice command may include a request for information, such as user data channel processing action amount, user data channel processing action due date, the vendor associated with the user data channel processing action, available funds to execute the user data channel processing action, and/or the like. The system may be configured to analyze and provide requested information to the acoustic device (e.g., the system may provide the user data channel processing action amount in response to a request for the bill amount).

In an instance in which the audible notification includes one or more potential responses, the system may be configured to automatically cause execution of the potential response included in the voice command. In an instance in which the voice command is not a potential response or no potential response is provided, the system may use machine learning to predict the intent of the voice command. For example, in an instance in which the voice command is "pay the water bill on Friday out of my main account", the system may be configured to determine that the user would like for the bill with the water company to be paid on the next calendar Friday with funds out of the primary account of the user. In some embodiments, the system may communicate a confirmation to the acoustic device of the actions to be carried out in response to the voice command. For example, the acoustic device may provide a confirmation to the user that the user can either confirm or deny (e.g., the acoustic device may transmit the message: "Did you say to pay the water bill on Friday, January 7?") The confirmation may require an additional confirmation from the user or may merely be a notification to the user of the actions being taken.

Referring now to Block 750 of FIG. 7, the method may include verifying the voice command from the acoustic device associated with the user is from the user. The system is configured to determine that the voice command user (i.e., the user that makes the voice command of the transfer request) is the same user as the device user associated with the acoustic device.

The voice command from the acoustic device associated with the user can be verified by comparing the voice command from the acoustic device associated with the user with a voice sample of the user using voice recognition technology. The system is configured to compare the voice command with a voice sample of the user associated with the acoustic device. The voice sample may be received during registration of the acoustic device by the device user (e.g., the device user may be prompted to provide a voice sample for use in the comparison). Additionally or alternatively, the voice sample may be obtained independent of any acoustic device registration. For example, a user opening an account with the entity may be asked for a voice sample for use by the entity. The voice sample may be used exclusively for authentication purposes, such as the operations discussed herein. The voice sample and the voice command of the transfer request may be compared using various voice comparison technologies (e.g., using speech recognition technology). For example, the system may use inverse filtering and/or analysis of voice characteristics, such as phonation, pitch, loudness, and rate to compare the voice sample with the voice command of the transfer request.

In an instance in which the identity of the voice command user does not match the device user associated with the acoustic device, the operations may be ended (e.g., the voice command may not be carried out as requested). Additionally, the system may cause a transmission of a message to the acoustic device that the identity could not be verified. In some instances, the voice command user may be prompted to communicate the voice command again, allowing the system to perform another speech analysis.

The method may also include other types of authentication to confirm that the device user is the same user as the voice command user. For example, the voice command user may be prompted via the acoustic device to provide a personal identification number (PIN). The PIN may be inputted verbally (e.g., the voice command user may say the PIN into the acoustic device) or haptically (e.g., the voice command user may tap the acoustic device a certain amount of times corresponding to the PIN). In such an instance, the voice command from the acoustic device associated with the user can be verified by comparing the provided PIN with an identification number associated with the user (e.g., a PIN stored in the account of the user). The system may prompt the user to input an identification number into the acoustic device during the operations discussed herein. The other confirmation methods may be used in place of or in addition to the speech analysis discussed herein.

Upon confirmation that the identity of the voice command user does match the user associated with the acoustic device, the system may proceed with performing the operations discussed in reference to Block 760.

Referring now to Block 760 of FIG. 7, the method may include causing an execution of the user data channel processing action based upon the verification of the voice command. After the voice command is verified, the system is configured to execute operations based on the voice command. In an instance in which the voice command is an authorization to execute the user data channel processing action, the system is configured to execute the user data channel processing action.

The system may also provide additional notifications to the user via the acoustic device. For example, the system may cause a transmission of an execution confirmation that notifies the user that the user data channel processing action was executed or scheduled to be executed. Additional communication between the system and the acoustic device may exist. The system may ask a user via the acoustic device if said user would like to automatically execute future user data channel processing action with the same vendor. For example, the system may cause the acoustic device to ask the user if said user would like the system to automatically pay the water bill every month in response to the user authorizing the payment of a water bill. Additionally, the user may be prompted to register a given payment method in the future (e.g., "Would you like to save the card ending in 1234 for future payments?").

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for augmented data channel processing using acoustic devices, the system comprising:
   at least one non-transitory storage device; and
   at least one processing device coupled to the at least one non-transitory storage device, wherein the at least one processing device is configured to:
      receive a request for a user data channel processing action associated with a user, wherein the user data channel processing action is associated with a vendor and the request is received (i) from the vendor directly or (ii) through an entity system;
      receive one or more additional requests for a user data channel processing action associated with the user, wherein each of the one or more additional requests for a user data channel processing action is associated with a different vendor;
      retrieve and extract information from the user data channel processing action associated with the user from each vendor, wherein extracting information comprises extracting a user data channel processing action amount from a PDF formatted user data channel processing action;
      cause an audible notification to an acoustic device associated with the user, wherein the audible notification is a prompt, including a processing action due date user data channel processing action amount, and each vendor related to the user data channel processing action, to authorize the user data channel processing action to be executed;
      receive a voice command from the acoustic device associated with the user, wherein the voice command is a confirmation of the user data channel processing action;
      verify the voice command from the acoustic device associated with the user is from the user; and
      cause an execution of the user data channel processing action based upon the verification of the voice command, wherein the user data channel processing action is executed on the processing action due date and is an electronic payment to each vendor.

2. The system of claim 1, wherein the at least one processing device is further configured to:
   receive user account information, wherein the user account information comprises at least one of a name of the user, a phone number of the user, or an address of the user; and
   cause a transmission of a request for user data channel processing action information for the user based on the user account information received.

3. The system of claim 1, wherein the audible notification comprises a user data channel processing action amount.

4. The system of claim 1, wherein the audible notification comprises one or more potential responses to the user data channel processing action.

5. The system of claim 4, wherein in an instance in which the voice command from the acoustic device associated with the user is one of the potential responses provided in the audible notification, the at least one processing device is configured to automatically cause execution of the potential response included in the voice command.

6. The system of claim 1, wherein verifying the voice command from the acoustic device associated with the user is from the user comprises at least one of:

comparing the voice command from the acoustic device associated with the user with a voice sample of the user using voice recognition technology; or comparing an identification number received from the acoustic device associated with the user with an identification number associated with the user.

7. A computer program product for augmented data channel processing using acoustic devices, the computer program product comprising at least one non-transitory computer-readable medium having computer-readable program code portions embodied therein, the computer-readable program code portions comprising:

an executable portion configured to receive a request for a user data channel processing action associated with a user, wherein the user data channel processing action is associated with a vendor and the request is received (i) from the vendor directly or (ii) through an entity system;

an executable portion configured to receive one or more additional requests for a user data channel processing action associated with the user, wherein each of the one or more additional requests for a user data channel processing action is associated with a different vendor;

an executable portion configured to retrieve and extract information from the user data channel processing action associated with the user from each vendor, wherein extracting information comprises extracting a user data channel processing action amount from a PDF formatted user data channel processing action;

an executable portion configured to cause an audible notification to an acoustic device associated with the user, wherein the audible notification is a prompt, including a processing action due date user data channel processing action amount, and each vendor related to the user data channel processing action, to authorize the user data channel processing action to be executed;

an executable portion configured to receive a voice command from the acoustic device associated with the user, wherein the voice command is a confirmation of the user data channel processing action;

an executable portion configured to verify the voice command from the acoustic device associated with the user is from the user; and an executable portion configured to cause an execution of the user data channel processing action based upon the verification of the voice command, wherein the user data channel processing action is executed on the processing action due date and is an electronic payment to each vendor.

8. The computer program product of claim 7, wherein the computer-readable program code portions further comprise an executable portion configured to:

receive user account information, wherein the user account information comprises at least one of a name of the user, a phone number of the user, or an address of the user; and cause a transmission of a request for user data channel processing action information for the user based on the user account information received.

9. The computer program product of claim 7, wherein the audible notification comprises a user data channel processing action amount.

10. The computer program product of claim 7, wherein the audible notification comprises one or more potential responses to the user data channel processing action.

11. The computer program product of claim 10, wherein in an instance in which the voice command from the acoustic device associated with the user is one of the potential responses provided in the audible notification, the computer-readable program code portions further comprise an executable portion configured to automatically cause execution of the potential response included in the voice command.

12. The computer program product of claim 7, wherein verifying the voice command from the acoustic device associated with the user is from the user comprises at least one of:

comparing the voice command from the acoustic device associated with the user with a voice sample of the user using voice recognition technology; or comparing an identification number received from the acoustic device associated with the user with an identification number associated with the user.

13. A computer-implemented method for augmented data channel processing using acoustic devices, the method comprising:

receiving a request for a user data channel processing action associated with a user, wherein the user data channel processing action is associated with a vendor and the request is received (i) from the vendor directly or (ii) through an entity system;

receiving one or more additional requests for a user data channel processing action associated with the user, wherein each of the one or more additional requests for a user data channel processing action is associated with a different vendor;

retrieving and extracting information from the user data channel processing action associated with the user from each vendor, wherein extracting information comprises extracting a user data channel processing action amount from a PDF formatted user data channel processing action;

causing an audible notification to an acoustic device associated with the user, wherein the audible notification is a prompt, including a processing action due date user data channel processing action amount, and each vendor related to the user data channel processing action, to authorize the user data channel processing action to be executed;

receiving a voice command from the acoustic device associated with the user, wherein the voice command is a confirmation of the user data channel processing action;

verifying the voice command from the acoustic device associated with the user is from the user; and causing an execution of the user data channel processing action based upon the verification of the voice command, wherein the user data channel processing action is executed on the processing action due date and is an electronic payment to each vendor.

14. The method of claim 13, further comprising:

receiving user account information, wherein the user account information comprises at least one of a name of the user, a phone number of the user, or an address of the user; and causing a transmission of a request for user data channel processing action information for the user based on the user account information received.

15. The method of claim 13, wherein the audible notification comprises a user data channel processing action amount.

16. The method of claim 13, wherein the audible notification comprises one or more potential responses to the user data channel processing action, wherein in an instance in which the voice command from the acoustic device associated with the user is one of the potential responses provided in the audible notification, the method further comprises automatically causing execution of the potential response included in the voice command.

17. The method of claim 13, wherein verifying the voice command from the acoustic device associated with the user is from the user comprises at least one of:
   comparing the voice command from the acoustic device associated with the user with a voice sample of the user using voice recognition technology; or
   comparing an identification number received from the acoustic device associated with the user with an identification number associated with the user.

\* \* \* \* \*